(12) United States Patent
McDermott

(10) Patent No.: US 7,043,366 B2
(45) Date of Patent: May 9, 2006

(54) METHOD FOR ENHANCING DEPTH AND SPATIAL RESOLUTION OF ONE AND TWO DIMENSIONAL RESIDUAL SURFACES DERIVED FROM SCALAR POTENTIAL DATA

(76) Inventor: Andrew Martin McDermott, P.O. Box 281, Potsdam, NY (US) 13676

( * ) Notice: Subject to any disclaimer, the term of this patent is extended or adjusted under 35 U.S.C. 154(b) by 134 days.

(21) Appl. No.: 10/463,672

(22) Filed: Jun. 18, 2003

(65) Prior Publication Data

US 2004/0260471 A1 Dec. 23, 2004

(51) Int. Cl.
*G06F 19/00* (2006.01)

(52) U.S. Cl. ............................................. 702/2; 702/14
(58) Field of Classification Search .................. 702/2, 702/14, 3; 324/350
See application file for complete search history.

(56) References Cited

U.S. PATENT DOCUMENTS

| | | | | |
|---|---|---|---|---|
| 4,835,474 A | * | 5/1989 | Parra et al. | 324/363 |
| 5,390,114 A | * | 2/1995 | Chapin | 702/5 |
| 5,673,191 A | | 9/1997 | Chapin et al. | 702/12 |
| 5,937,362 A | * | 8/1999 | Lindsay et al. | 702/9 |
| 6,125,698 A | * | 10/2000 | Schweitzer et al. | 73/382 G |
| 6,152,226 A | * | 11/2000 | Talwani et al. | 166/252.4 |
| 6,191,587 B1 | * | 2/2001 | Fox | 324/350 |
| 6,467,543 B1 | * | 10/2002 | Talwani et al. | 166/252.4 |
| 2002/0169559 A1 | * | 11/2002 | Onyia et al. | 702/14 |
| 2003/0004648 A1 | * | 1/2003 | Huffman et al. | 702/14 |

OTHER PUBLICATIONS

Andrew McDermott et al., Gravity and Magnetic Signature of The Loon Lake Syncline Adirondack Highlanda New York, NW 38th Annual meeting, paper 18–11, Mar. 27, 2003, All pages.*

P. Hornby et al., Analysis of Potential Field Data in the Wavelet Domain, Australian Geodynamics Cooperation Research Center, Research Paper, Dec. 30, 2002, All Pages.*

* cited by examiner

*Primary Examiner*—John E. Barlow
*Assistant Examiner*—Victor J. Taylor

(57) ABSTRACT

An improved method is disclosed for collecting or assembling scalar potential data measurements that are to be subsequently prepared as a surface representation for analysis via frequency domain transform filters. Measurements are made over a geographic reference region which extends in all cardinal directions from the center of some previously determined primary region. The reference dimensions must contain the primary region and must be plural multiples of the greatest depth to be considered in analyzing the contributions to the measurements. A combined or separate improved method for delineating or defining geospatial information contributing to a scalar potential surface is disclosed. This method is implemented using traditional statistical techniques to construct an histogram from the set of values comprising a surface representation. This histogram constitutes a Spatially Correlated Potential Spectrum for the surface. These combined and separate methods improve resolution of geological structures over depths and spatial extents under consideration.

1 Claim, 2 Drawing Sheets

Inventive Technique

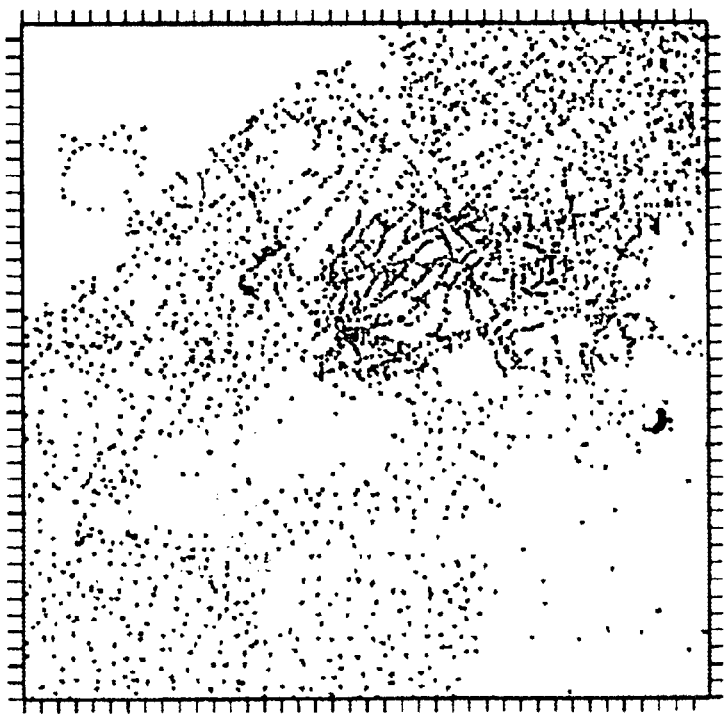
FIG. 2 Inventive Technique
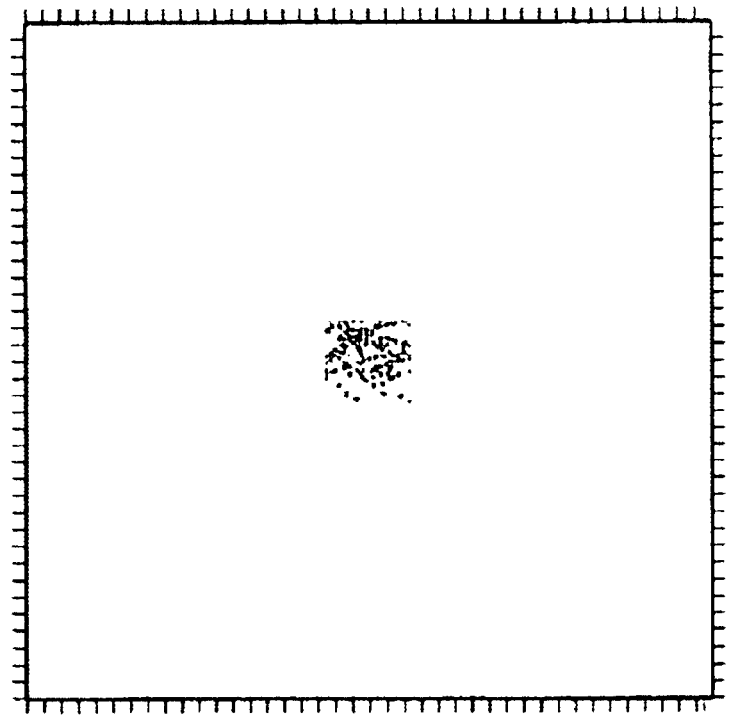
FIG. 1 Prior Art Technique

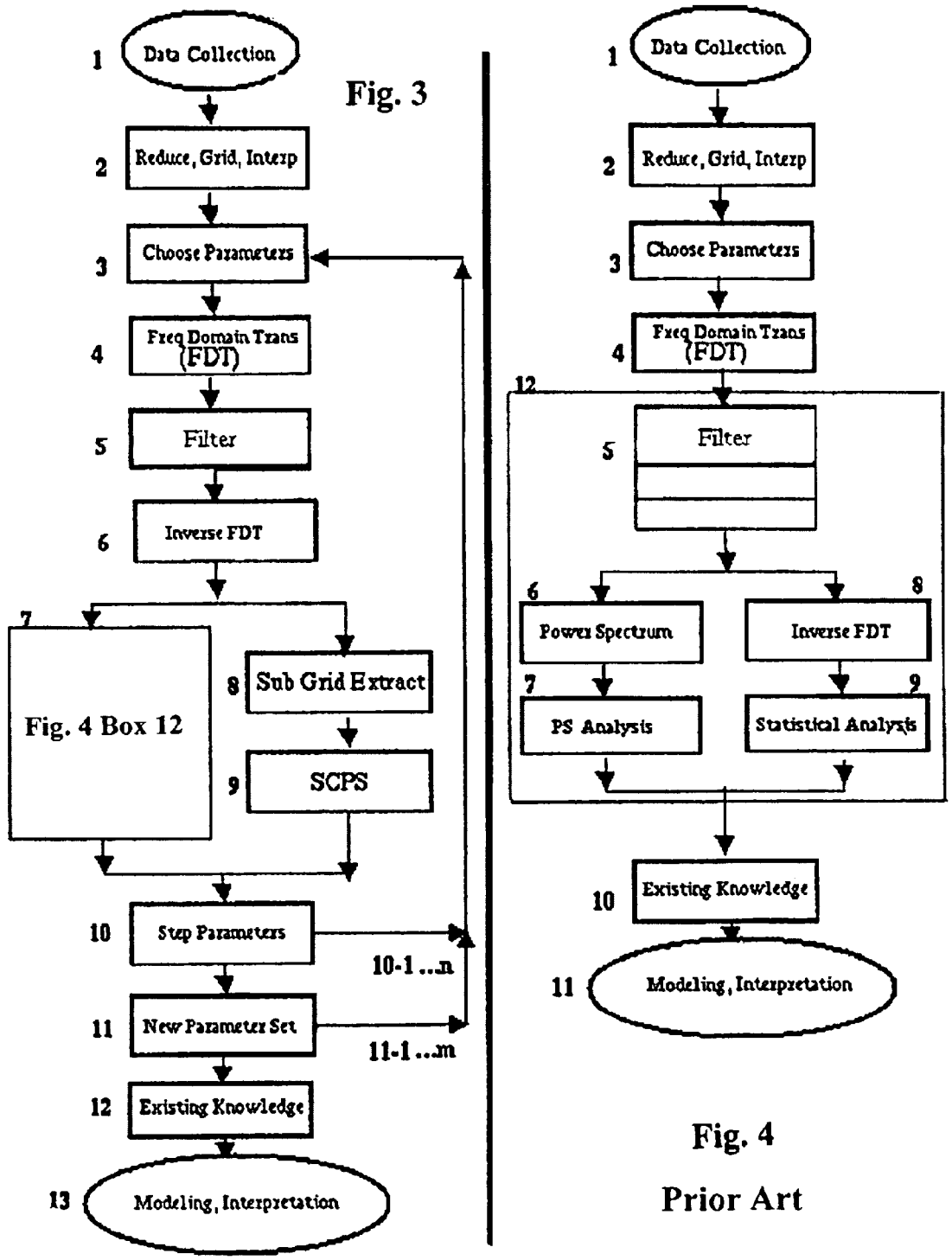

METHOD FOR ENHANCING DEPTH AND SPATIAL RESOLUTION OF ONE AND TWO DIMENSIONAL RESIDUAL SURFACES DERIVED FROM SCALAR POTENTIAL DATA

CROSS-REFERENCE TO RELATED APPLICATIONS

Not Applicable

FEDERALLY SPONSORED RESEARCH

Not Applicable

INCORPORATION-BY-REFERENCE OF MATERIAL SUBMITTED ON A COMPACT DISC, SEQUENCE LISTING, OR PROGRAM

Not Applicable

BACKGROUND OF INVENTION

1) Field of Invention

This invention relates to techniques for the collection and processing of gravity, magnetic and other scalar potential data for the purposes of enhancing or increasing the quality and quantity of the information concerning depth and spatial resolution which is provided through the application of frequency-domain filtering techniques and related or similar residual techniques to one and two-dimensional gridded and interpolated surface representations of scalar potential data.

2) Description of Related Art

The primary goal of studying scalar potential data is to develop a better understanding of the subsurface geology of the Earth. Gravity data, for example, provide information about densities and spatial characteristics of subsurface structures. Such data are therefore useful in oil, gas and mineral exploration. More specifically, the usefulness of such data derives from the extent to which they provide spatial and other physical information about structural localizations, or anomalies, at various levels of depth.

Each gravity measurement determines, at the station location, the sum of all effects from the grass roots down. A gravity map is seldom a picture of a single isolated disturbance but almost always a combination of relatively sharp anomalies which must be of shallow origin, of anomalies with intermediate dimensions . . . and of very broad anomalies of a regional nature, which may have their origin far below the section within which the geological interest lies. Therefore, gravity interpretation frequently begins with some procedure which separates the anomalies of interest from superficial disturbances on one hand and the smooth, presumably regional effects on the other. Nettleton, L L, "Gravity and Magnetics in Oil Prospecting", McGraw-Hill, Inc, NY (1976) pp. 134

It is seldom that a geological interpretation would be based on gravity data alone Dobrin, M and Savit, C "Introduction to Geophysical Prospecting Fourth Edition" McGraw-Hill, Inc., NY (1988) p 614

Scalar potential data interpretation involves techniques for separating the contributions to the total potential at the measured and interpolated location of anomalies of interest that may be due to shallower disturbances from those of deeper, perhaps regional, sources. As a practical matter, separation that yields detailed depth resolution of structure has not been achieved using established geophysical methods applied solely to a single type of scalar potential data.

The typical conventional process for measuring, processing and analyzing scalar potential data so as to extract information regarding the spatial characteristics and relative physical properties of subsurface structure involves a number of steps. Gravity data will serve as the representative scalar potential data for most of the following discussion. There are analogous arguments for any other geophysical scalar potential data. The Fast Fourier Transform (FFT) and its associated Inverse Fast Fourier Transform (IFFT) will serve as the representative frequency domain transformation technique. A generalized prior art procedure has been illustrated in FIG. 4.

First, gravity data are collected in accordance with an established protocol at representative surface locations within a region as represented in FIG. 1 and as indicated in FIG. 4. The data are reduced and corrections are made for such factors as the geoid contribution, the free air anomaly, the elevation above sea level and possibly the influence of local terrain as deemed necessary for locations within the region. The corrected dataset is contoured or interpolated using established algorithms that may be implemented manually or with the aid of computers. The results are generally forced onto a predetermined coordinate grid using a well-defined mathematical transformation to create a Bouguer Anomaly surface, of FIG. 4. The effective grid resolution of the actual data coverage is traditionally considered to be the primary factor in determining the final resolution and accuracy of detail of spatial information regarding subsurface structures at a particular interpolated scale. The effective grid resolution is affected by such factors as the number of measurements available, their spacing, and the dimension or dimensions of the traverse or region over which the measurements are extended. Well-defined analytical, statistical and transformational tools are then employed to extract a maximal quantity of physical information while introducing a minimal degree of uncertainty. There are three complementary approaches to analyzing the resulting gridded and interpolated scalar potential surface representation. These techniques, which may be used separately or in cooperation to derive information regarding subsurface structure, and which are diagrammed in FIG. 4:

(1) Spatial techniques that rely on analytical, statistical and visual methods to define or delineate features of the subsurface structures. These may also employ spatially correlated datasets of other types and correlative or covariance methods or similar analytical and statistical methods to refine or facilitate such definition and delineation (FIG. 4).

(2) The use of a one or two-dimensional frequency domain transform, e.g. a FFT, followed by a mathematical filtering step to accomplish the frequency domain removal of those frequency elements corresponding to specific wavelength scales in the spatial domain, and the application of an IFFT back to the spatial domain to show only the remaining anomalies. This process is classified as a residual process. The resultant gridded and interpolated surface representation is classified as a residual surface. Also employed may be implementations of second derivatives, or upward or downward continuation filters to additionally define the features of subsurface structures indicated by the extensions to the box.

(3) Spectral methods including power spectrum analysis or wavelet analysis of the frequency transform of the potential surface and residual surfaces. These methods can compensate for the spatial and depth related uncertainties inherent in established frequency-domain transform filtering techniques. These methods may be supplemented by expansion algorithms and other advanced synthetic procedures that can be used to derive approximate values for some specific spatial parameters. These parameters serve as the initial values for forward-modeling and inversion techniques which are designed to determine simulations of the actual physical structure responsible for the original data as measured.

For example, a potential surface may have been prepared through a residual process in which a FFT and IFFT are used with an intermediate frequency, or equivalently wavelength, filtering step in an attempt to separate shallow structure from deep structure effects. The anomalous structures revealed or defined within the residual surface representation are then reviewed and models are formulated based upon the known geology to the depths of interest. Second derivatives, upward and downward continuation, and additional residuals may be employed to get a sense of near-surface or at-depth trends in the total anomaly to aid in the modeling and interpretation. Inversion calculations from assumed parameter values are performed with optimizing algorithms and other modeling enhancements to produce a total anomaly for comparison to the interpolated value at each discrete point in the region under consideration.

The theory and use of frequency domain transform filtered residuals, particularly FFT/IFFT derived residuals, has been documented in the literature for decades Due to the cost and technological complexity of such work individual researchers have often made use of manual plotting and contouring of the field datum before consideration, followed where possible by a graphical or mathematical reduction procedure that has as its intent the production of a residual surface. The use of computerized algorithms has traditionally been left to large research efforts and private industry.

Advances in computational techniques and hardware as well as theoretical studies in geophysics and related fields have effectively eliminated these barriers. Internet technologies and high-speed communication have provided the means to acquire the tools and gain the skills necessary to make use of the information and tools that can be accessed. However, the biases developed in the field over years of research activity and the commercial investments that have been made to develop and apply costly and complex tools for the inversion and forwarding modeling approach have contributed to reduced emphasis on the development of the FFT/filter/IFFT and equivalent procedures as reliable qualitative and quantitative tools.

As is well known in the art, the frequency (in the spatial domain) with which the measured potential fields vary provide an indication of the depth of the geological structure. For example, a short wavelength (high frequency) deviation in the measured space-domain potential field indicates the presence of a geological structure near the surface of the earth, while long wavelength (low frequency) deviations of the potential field possibly indicate structures at deeper depths within the earth. The difference in frequency of these deviations is largely due to the attenuating effect of the earth, since higher frequency signals are more strongly attenuated by a given thickness of the earth than are lower frequency signals. As such, frequency domain analysis of potential field measurements can be useful in determining the depth of particular geological structures. Fourier techniques are therefore commonly used in the analysis of potential field measurements. However, as is well known in the art, the depth available to resolution and analysis is at best on the order of the maximum characteristic length scale, i.e. spatial extent, of the region for which data is available. It has also been observed that certain ambiguities and difficulties in the analysis of potential field anomalies exist when conventional Fourier techniques are used. For example, a significant signal at a low frequency may be produced both by a deep and sharply defined structure, and also by a relatively smooth and shallow structure. Conventional Fourier analysis is unable to distinguish these structures from one another. In addition, overlying shallow structures can mask the effects of deeper structures of interest on the measured potential field anomalies. . . . Adjacent but not overlying structures can also interfere with the measured potential field deviations produced by a geological structure. . . . Yet another difficulty in the analysis of potential field measurements using conventional Fourier techniques is presented by variations in the elevation of the surface locations. As noted above, the geomagnetic field and gravitational field varies inversely with at least the square of the distance of the measurement from the center of the earth. As such, deviations in the measured potential field caused by changes in elevation must be taken into account in the analysis; however, this process is somewhat difficult and complex according to conventional Fourier techniques. These ambiguities, masking effects, and interference effects significant limit the ability of conventional Fourier analysis to detect important geological structures from potential field measurement data. Chapin, et al. U.S. Pat. No. 5,673,191 (1997) Paragraphs 3–8 of "Background"

Except in very simple cases, the separation of the observed field into its component parts is quite difficult and sometimes not possible at all . . . the lack of uniqueness in the gravity field from a subsurface source means that an infinite number of different configurations can result in identical gravity data at the surface. To resolve such ambiguity, other information than that from gravity is needed. . . . No amount of computer manipulation can compensate for a poorly designed survey. Dobrin, M and Savit, C "Introduction to Geophysical Prospecting Fourth Edition" McGraw-Hill, Inc., NY (1988) pp 581–582

The fundamental ambiguities or uncertainties that have been recognized within the analyses of scalar potential data using residual techniques have been recognized for decades. These can be collectively titled "the Geological Uncertainty Principle" for convenience. Simply stated this implies that there is no way to analytically resolve the possible contribution from a deeply seated and spatially extended source from that of a shallow and more localized source using scalar potential data alone. This principle has resulted in the pre-eminence of seismic research in exploring subsurface structure. The principle has also served in part as the motivation for the development of a complex and resource-intensive inversion and forward modeling tools and related hybrid synthetic and analytical techniques. For example, power spectrum analysis is sometimes used in an attempt to isolate the most prominent frequencies within the extracted frequency domain representation of a gridded and interpolated residual scalar potential surface. This approach attempts to identify and to expand mathematically upon these prominent frequencies in order to derive spatial and physical characteristics that may provide some input parameters for synthesizing first order models to be used within the inversion and forward-modeling process. Direct spatial correspondence for the information contained within the power spectrum is lost when the frequency domain transformation is performed. The identification of the extracted parameters in terms of the visible spatial anomalies in the original gravity surface is dependent upon intuition and intelligent guesswork.

The historical investigations with large datasets covering spatially extensive areas tens and hundreds of kilometers on a side have been based upon interpolation theory and practice that demanded grid spacings on the order of the location separation of the original data. The digital filtering required sufficient statistics, or number of points, within the surface in order provide meaningful and reliable results. This combination of constraints required that the regions be 100 or more kilometers per dimension. The structures resolvable on this scale are limited to those with closed contours at least the order of kilometers in diameter. Large, deep structures were most accessible under these conditions and the success of filtering theory, especially when reproducing known structure from deep seismic reflection studies, depended upon this.

Shallow structure and high-pass filtering were defined primarily in terms of depths below 10 and 15 kilometers until the improved techniques and hardware of the 1990's and early 2000's. The focus had shifted by this time from development of filtering theory toward the development of grid-related inversion modeling tools and relaxation techniques. The improved interpolations available to geologists made it possible to examine structure at smaller scales over smaller regions. The regions of interest reduced to kilometers per side and several kilometers of depth with a proportional increase in the density of field measurements within the region. The models provided to inversion techniques were derived from much thinner depth extents, or layers, and much less cumulative structure. These efforts still involved the limited information contained within the data for the primary region of interest and a minimal use of filtering to reduce the complexity of the structures. They also relied heavily on experience, intuition and intelligent guesswork to develop the models from the faintest suggestion of separation between structural elements in the residuals produced.

The prior art references in the literature from the 1970's to the present make limited use of the power an utility of the FFT and equivalent transformations and their spectral representation of the spatial information. This can be understood in the earliest work in the light of interpolation limitations described previously. Such studies rely upon sets of gridded and interpolated residual surface representations created by filtering a single potential surface using different rules. The technique does not vary in a regular way over large ranges of spatial parameters related to the filtering. It uses a few, generally very large, successively shallower base depths separated by tens or hundreds of kilometers over the entirety of a single primary geographic region of interest with fixed spatial extent.

Instabilities or deformations in the residual surface representations are introduced by application of the frequency-domain transform filter and include the oscillatory edge-effects at (previously) infinitely sharp region boundaries of the studied regions. These also include the regular appearance of symmetric side-nodes of opposing density or magnetization or other relevant physical interpretation about any well-localized anomalous structures. These occur when too few highly localized anomalies are found in a frequency-domain transform filtered residual surface when there are no other pronounced or extended structures in the region. Another way to express this condition is to say that the region has been inadequately sampled by the original measured or assembled dataset. The limitations of the available filtering and gridding tools in the earliest studies are certainly in part responsible for the appearance of these problems. It is also important to note that the use of multiple filters that remove frequencies, i.e. information about characteristic lengths or directional dependence, will intensify any errors introduced by each individual filter. This means that use of a high, low, or band pass filter followed by a similar filter or an anisotropic directional filter is more likely to exhibit instability in the form of oscillatory or periodic structure than a similar treatment that uses only a single frequency removal filter.

The oscillations and instabilities can be explained from the theory of filtering as resulting from the combination of factors inherent in the techniques employed. The increase of density of coverage for a specific set of scalar potential measurements at locations within a region of interest has been used for decades to enhance the information available concerning the interfering edges of subsurface structures. This is in accord with the theoretical discussions of the relevant errors that are manifest in the residual surfaces produced from inadequately sampled regions. The long range oscillations and large scale deformations that result from the removal of frequency components are also well understood. These are a result of the discrete nature of the gridded and interpolated representations and the finite extent of the regions that are filtered. Solutions to the problems introduced by the oscillatory structure of finite, filtered data sets are discussed in many references within the prior art.

Gibb's phenomenon is one characteristic of the FFT algorithm that causes error. Any large jump in value from one data point to the next causes a discontinuity and will result in oscillations to appear when the data is transformed from one domain to the other. Jumps in value may be real, such as due to an unusually high gradient in the gravity field, but will still cause ripples to appear in the filtered data set. These ripples will be greatest at the point of discontinuity and taper off to both sides. If the discontinuity is small, the oscillations due to Gibb's phenomenon may be tolerable, they may not even be apparent when the data set is contoured, but at times they can cause a great amount of error. Another characteristic error that occurs due to the FFT is leakage. If a data set is continuous and infinitely long it can be transformed from the space domain to the frequency domain by multiplying it by the Fourier integral. To transform a discrete data set over a finite region one uses the Fast Fourier Transform algorithm. However, the FFT algorithm makes some assumptions that may affect the trueness of the results. The FFT assumes a data set of limited length represents a summation of an infinitely long series of sine and cosine waves. The finite data set is assumed to be one fundamental period of the infinite series. That is, the data set repeats over and over, making it infinitely long. As a result, one end of the data set is placed against the other end. During filtering, this may cause information from each edge of the map to affect data on the opposite edge. This is called leakage (Dobrin, 1976, Reed, 1980). Leakage of the Fourier signal from one side of the data set to the other can cause great amounts of error. If the two ends of the data set have greatly different amplitudes, the values on one side of the data set may affect values on the other side. Since in potential field studies it is not known what the data should look like, it is not always possible to tell whether leakage has occured. Various methods have been studied to limit leakage. Sato (1954) suggested entering a region of zeros at the ends of the data set. It was believed that any leakage that did occur would appear in the extended regions. After filtering, the extended region would be discarded. However, adding zeros still caused a discontinuity between the data set and the filled region of zeros. Leakage was limited, but Gibb's phenomenon remained. Tsay (1975) improved on Sato's method by suggesting that the extended region be filled with the end values. Again, after filtering, the extended regions would be discarded. Again, a discontinuity still exists, the value at one side of the data set differs from the value at the other, but the discontinuity has been moved away from the real data. Error caused by Gibb's phenomenom remains, but a buffer has been created to absorb the error. (Although the methods presented by Sato and by Tsay were written to be applied to a Fourier series method, the application to the Fast Fourier Transform is the same.) A new method is proposed to limit errors due to leakage and Gibb's phenomenon. In this method the discontinuity from one side of the data set to the other is eliminated by extending the data set and filling the extended region with a reflection of the data set. . . . As was stated above, the FFT assumes that the data set is periodic. The Fourier transform is calcuted as if the last-point in the data set is followed by a repeat of the first point. This can cause great discontinuities in the data if the value at one end is greatly different than the value at the other. Transforming such a data set with the FFT will cause a significant amount of leakage and Gibb's phenomenon. If by chance, the gravity value at one end of the data set is close to the value at the other end, these errors will be small. However, if there is any type of regional trend across the data set, it is likely that the difference between the two ends will be great and the errors will be severe. . . . One method of limiting edge effects is to taper the edges of the data set. This is done by multiplying the data set by a window so that each end of the data set tapers to zero. . . . Leakage has been limited, but in doing so, the original data set had to be modified. Therefore, the error in the filtered data has been increased. Another method to limit leakage and Gibb's phenomenon is to add a buffer of data to both ends of the data set so that any errors will happen away from the original data set (Tsay, 1975). If the data set is extended to twice its original length, with the extended region half filled with one end value, and half filled with the other end value, information on one end of the data set will not be able to leak over to the other end. A discontinuity still exists, but it occurs away from the original data set. It is hoped any errors due to this discontinuity will only occur in the extended region and will not affect the original data. . . . One may suppose that extending the data to greater lengths may decrease the amount of error more, but studies indicate that the decrease is not significantly . . . shows a new method to limit leakage and Gibb's phenomenon . . . shows the data set again extended, but instead of filling the extended region with the last data value, it is filled with a reflection of the data set. In this manner there are no discontinuities from one side of the data set to the other. . . . It has been shown that the wavenumber filtering method using the Fast Fourier Transform can give good results if one takes steps to limit errors due to leakage and Gibb's phenomenon. One of the best way to limit these error is to extend the data set one data length, filling the extended region with the data sets end vaules, or with the reflection of the data set. Fogarty T M, "Wavenumber Filtering of Gravity Data and its Application to Interpreting Structure in the Western Transverse Ranges of Southern California", University of Southern California Graduate School of Geology (Master's Thesis 1985) Ch 2, Sec 3, Para. 3–14

This effect is called spectral leakage and is due to the finite extent of record lengths. . . . To smooth out the discontinuities . . . windowing functions are used which taper off to zero at the edges thus minimizing the spectral leakage . . . Schwarz K P, et al., "The Use of FFT Techniques in Physical Geodesy", Geophysics Journal International (1990) Volume 100 Number 3, pp 485–514

The practical approaches suggested in the reviewed literature for the extension of datasets can be summarized as either tapering (or windowing), or as padding. Tapering refers to the practice of mathematically altering the values at the edges of an interpolated surface to reduce the values smoothly to zero (or a common value) along matching edges. Padding involves adding a region of constructed data to each edge of a surface. This creates a larger region with matching edge values artificially, in order to reduce the oscillatory effects. The use of a baseline of measurement that extends far beyond the region of primary interest and for plural multiples of the maximum depth of interest in order to provide for increased or enhanced detail at appropriate scales of display or contrast has never been explicitly stated nor clearly inferred nor referenced in any of the reviewed prior art. This protocol and the corresponding prior art protocol are illustrated at representative relative scale in FIGS. 2 and 1 respectively. That is to say that there have been found no recorded attempts nor any references making use of quantitatively and qualitatively significantly larger regions of actual data to provide additional resolution and increased stability within a smaller subregion in subsequent frequency-domain transform filtering.

It is significant to note that in prior art references through to the most recent relevant patents and papers that have been reviewed the failure to produce true depth resolution of structure with gridded, interpolated and frequency-domain filtered scalar potential data representations has been attributed to the Geological Uncertainty Principle as described above. This principle is a restatement of the concepts from potential theory known as Green's Equivalent Layer . . . that any given potential has an infinite variety of consistent boundary conditions . . . a gravitational potential caused by a three-dimensional density distribution is identical to the potential caused by a surface density spread over any of its equipotential surfaces. (p 61) . . . Hence, an infinite variety of magnetizations can be conceived for the infinite slab, all producing precisely the same magnetic field. (p 98) Blakely, R "Potential Theory in Gravity and Magnetic Applications" Cambridge University Press, Cambridge UK (1996)

The full Fourier representation for an infinite/periodic potential surface is absolutely unique, that is to say, the infinite coefficients in the transformed surface representation expansion uniquely determine all contributions from every point in space. The discrete and finite nature required for the actual computations performed in scalar potential analysis are the principal source of all oscillation and ambiguity. The reduction of the thickness of the extracted residual layers must be combined with a reduction in the oscilatory effects to provide the most accurate and complete determination of the included structures. The Geological Uncertainty Principle is a statement of the impossibility of this simultaneous reduction according to the existing art. The proposed invention when taken to its theoretical extreme implies that this principle is not correct. It should be possible, in theory, to uniquely determine the depth evolution of a scalar potential field from its value and the value of its residuals at every point on the grid. This will be constrained by the limit of the resolution inherent in the original measurements and their subsequent interpolation. The most significant requirement for this to be true involves the baseline of the original field measurements and its relationship to the dimension or dimensions of the primary region of interest for each stage of an investigation. Any single filter applied to a surface interpolated from data collected according to an extended baseline protocol as described will produce more resolved and detailed information within any residual extracted from the primary region of interest. The second requirement for realizing maximal information involves a logical and obvious extension to the protocol followed in applying the filters to the scalar potential surface representation in order to maximize the benefit derived from the extraction of the depth and spatial information.

3) Objects and Advantages of the Inventive Technique

The present invention is concerned with the implementation of methods for the collection and processing of scalar potential data, such as gravity or magnetic data, in order to define the geophysical characteristics of the subsurface of the earth with an increase in the quality and quantity of information available concerning depth, spatial resolution and other physical characteristics. When the techniques described are used individually or cooperatively they provide a desired but heretofore never achieved level of qualitative or quantitative information about subsurface structures.

An object of the present invention is to use these techniques to obtain detailed geophysical and geospatial information concerning subsurface structures of various thickness and area coverages at various depths and depth extents (layer thicknesses).

Another object of the present invention is to use these techniques to obtain detailed qualitative and quantitative information concerning the spatial and depth extent of large scale anomalous accumulations and more localized anomalies. This amounts to determining the depth and physical origin of all contributions to any identifiable point, feature or region in the original interpolated scalar potential surface representation.

According to one aspect of the invention, it provides a method for collecting or assembling and then processing scalar potential data for the purpose of analyzing subsurface structure. This method comprises the selection of locations according to normal geological practices over a baseline defining a reference region containing within it some defined region of primary geophysical interest. Said reference region should have a spatial dimension or dimensions, or its baseline or baselines, extending the maximum number of multiples of the greatest depth of interest within said primary region that can be practically achieved. Normalization and gridding of the data is then performed according to normal geological practices prior to the application of frequency-domain filtering techniques.

According to another aspect of the invention, it provides means through the increase of information for implementing a method of processing scalar potential data for the purpose of analyzing subsurface structure using multiple or iterative application of the sequence of operations defining a frequency domain filtering transformation to a gridded and interpolated scalar potential surface representation. The method proceeds so that the filtering characteristics are different for each application or iteration to produce a set of residual scalar potential surface representations from the original potential surface such that the information so extracted corresponds to the delineation of subsurface geological structure over a plurality of depths, thicknesses and area coverages.

BRIEF SUMMARY OF THE INVENTION

In accordance with the present invention it is required that analysis of the measurements of scalar potential data proceed from a protocol utilizing measurements within a reference region containing and extending beyond the primary region of geophysical interest to provide increased quality and quantity of information about structures that exist beneath the surface of the primary region of interest as revealed by frequency-domain filtering techniques applied to the gridded and interpolated scalar potential surface representation of the original measurements. It has been recommended that the filtering process be done a plurality of times in a logical and obvious manner in order to additionally enhance the interpretations of the revealed structures.

BRIEF DESCRIPTION OF THE SEVERAL VIEWS OF THE DRAWINGS

FIG. 1 is a view of the result of the application of the protocols for data acquisition of scalar potential data for a generalized primary region of geologic interest according to parameters consistent with the prior art.

FIG. 2 is a view of the result of the application of the protocols for data acquisition of scalar potential data for the same generalized primary region of geologic interest as in FIG. 1 but using the proposed inventive technique for selecting the baseline for these measurements.

FIG. 3 is a generalized process for the implementation of the preferred embodiment of the separate and combined proposed inventive techniques. The alternate path following step 5-6 has a step labeled SCPS which represents any alternative and supplemental spectral or analysis technique not involving power spectrum analysis.

FIG. 4 is a generalized process for the implementation of the prior art techniques as derived from the literature and from experience for the frequency transform analysis of scalar potential data.

DETAILED DESCRIPTION OF THE INVENTION

A fundamental premise of the present invention is that the information required to resolve structures over depth at all levels of depth is increased in quality and quantity, or enhanced, by extension or extensions of the actual baseline or baselines of the experimental measurements in all relevant cardinal directions from the center point of the primary region of interest. Among the priorities to consider in choosing or acquiring a set of potential data are the depth or range of the region to be studied, and the size of the primary region of interest.

Data such as gravity measurements are collected in accord with some established protocol at representative locations within a region. The baseline of the final, assembled set, or reference region, should be as large as possible within the computational constraints introduced by the reference region size and the final resolution of the full reference region's gridded and interpolated scalar potential surface representation, cf FIG. 2. A region with an extent in each cardinal direction of at least ten times the primary base depth of interest to be considered is preferred for the reference region when the effective coverage of the original measurements has a resolution on the order of one to five kilometers. The data may be reduced and corrected, e.g. for the geoid, the free air anomaly, the elevation and possibly the local terrain in gravity studies, as deemed necessary within the reference region. The data are gridded and interpolated by any of a number of established algorithms to create a gridded and interpolated representation of a mathematically smooth surface at some reference elevation. Sea level, or the zero level of terrestrial elevation, is the generally accepted reference elevation. This comprises the step FIG. 3 step2.

The full reference region interpolation is used to produce a set of residual surfaces each of which is defined by the application of, for example, a FFT followed by a frequency/wavelength component filtering step followed by an IFFT, to the values that represent the original full reference region interpolated surface. This is diagrammed in FIG. 3 step2, and includes a subgrid extraction from the primary region of interest in. The filtering step may be performed to pass high frequency structures representing short length scales (standard residuals from depth to surface). It may pass only low frequency components of structure representing long length scales (from maximum depth, essentially the earth's core depth, up to some shallower depth). It may pass a range or band of characteristic structural sizes. The filters may implement isotropic or anisotropic filtering. They may have tapered edge or sharp or other cut-off filtering characteristics. Each filter can be classified for convenience as a band-pass filter with a distinct range consideration and cut-off choice. A full consideration of residual surfaces for use in the described technique should contain value sets representing surfaces that span several orders of size in area coverage about some point of reference. These value sets can be produced from the corresponding full reference region residual produced in the filtering step by resampling or removing a desired subregion using established gridding techniques. The set of residuals so produced should span an entire depth range of interest in meaningful incremental steps and the set should represent a range of possible layers, or depth range per surface, for each incremental depth. This is illustrated through the choices made for each residual in FIG. 3 step2 and for each considered set.

In other words, the present invention employs the mathmatical properties of the general frequency domain transformation techniques as understood from the analysis of continuous and discrete functions and makes use of the approach to instability across the primary region of interest being considered as a guide in determining modifications to the analysis protocol as the study progresses. The sets of residual surfaces produced generally involve the application of a single filter per original reference scalar potential surface representation, repeated for meaningful and logical combinations of values sampled from a full range of available values for each spatial parameter of length, width, depth and thickness. A single pass of the technique could involve a few to a few hundred of value sets representing surfaces that vary regularly in each spatial parameter and that can be organized or ordered into subsets according to the combination of the parameter values.

For example, a problem concerned with the structures within some volume of the earth from a depth of about 3000 meters (m) up to the surface and spanning 0.03 degrees latitude and longitude, about 3.3 kilometers (km) on a side, might be decomposed as follows:

Pass 1: Depth-to-surface residuals from 3000 m to 500 m depth increments over a full baseline region with dimensions approximately 35 kilometers on a side (the reference surface) are extracted. This reference region contains the primary region of interest as nearly as possible to its center. The filtering routine would be provided with the base depth, the depth increment, the limiting residual depth, the filter taper type (if any), and the boundaries for the primary region and any subregions desired. The filtering would be applied to the entire area defined by the baseline. The necessary sub-regions at smaller scales of detail would be removed using established grid extraction techniques.

Pass 2: Several depth ranges that might contain interesting transitions or evolutions as evidenced in the residuals from Pass 1 after consideration of all of the surfaces produced would be re-examined using band pass filters. The filtering routine would be provided with the base or top depth, the layer thickness, the depth increments, the thickness increments, the taper parameters, if any, and the boundaries of any desired subregions.

Subsequent passes could be made to focus more closely on the same or other subregions using the same iterative approach, or would shift center of focus and repeat the process, etc. The actual steps used would be made after consideration of each complete residual set in the light of all known geologic information for the regions and on the basis of interpretations made while considering each set.

The interative use of the filtering techniques a plurality of times characterized by parameters as described and in accordance with the inventive technique as herein disclosed can refine the understanding of the nature and extent of structure development with depth within a primary region of interest. This information can be applied in conjunction with existing geophysical knowledge and theory to enhance the interpretations and to provide realistic models for additional analysis using the full range of existing techniques. The inventive technique is also reproducible, consistent and involves the easily automated repetition of essential tasks. Combined with additional geologic knowledge and professional collaboration this technique has tremendous research and practical potential.

When the techniques described are applied cooperatively they overcome the Geological Uncertainty Principle described above to reproduce true depth-resolution of structure with gridded, interpolated and frequency-domain transform filtered scalar potential data.

The FFT and equivalent transformations uniquely determine each coefficient of the relevant basis functions in the frequency domain based upon contributions contained in all the interpolated points that determine the structure in the gridded and interplated scalar potential surface representation. The transformations are constrained by the discretization of the information, the assignment to a grid and by the assumption of a uniform vertical density below each location in a depth thickness or layer.

The less depth extent, or layer thickness, contributing to the accumulated information concerning the materials within the filter-produced residual surface the more reliable is the information available for extraction. The frequency-domain transform filters, however, rely upon maximum thickness, or frequency components, in order to compensate for the edge oscillations introduced at the infinitely sharp region boundaries by the removal of any specific range or ranges of frequency components. These oscillations can corrupt the signal at or near the edges of the reference region involved and will ultimately propagate into less sharp edges that define any included structures within layers defined within the primary region of interest if the baseline is not sufficiently large so as to restrict the effect of the oscillations far from the anomalies of interest.

There is a point in any approach to layer thinness at which the potential information approaches the level of random noise and any information about structure becomes unreliable. Information about extremely shallow and extremely deep structures, especially with regard to their evolution with depth, will be less accessible if the dataset used does not have sufficient baseline for the depth involved or if it lacks adequate effective coverage within that baseline.

Preferred Embodiment

An example of the application of the present invention is provided below as an illustration of the employment of the technique and in order to indicate the broad range of geophysical solutions that may be facilitated. This is based upon actual work performed using a subset of a well charcterized dataset where the total coverage of the original dataset exceeds 7 degrees of latitude and five degrees of longitude with an effective average spacing of approximately 4 km. Three freely available, Open Source, cross-platform software tools were combined into a scripted interface to create an almost fully automated facility for this work. The first tool was a set of command-line programs that provides data gridding and interpolating facilities and a powerful FFT-filtering-IFFT implementation. The second tool was a scriptable, command-line based Geographic Information Systems(GIS) software package with a Graphical user interface(GUI). The third tool was a powerful interpreted scripting language. Custom external scripts controlled the process of preparing the full reference region gridded and interpolated scalar potential surface representation and its residual surface representations from the prepared measurements and importing them into the GIS environment.

A region approximately 3 kilometers (km) on a side and extending to 1500 meters (m) beneath sea level comprises the working area of a zinc mine in Balmat, N.Y. An investigation using the described inventive technique was conducted in an effort to locate and identify a suspected parent ore body that had been hypothesized by mine geologists from the consideration of several decades of mine exploration and characterization. The inventive technique was constrained by the combined maximum depth and spatial extent of all known stratigraphic units contained within the mine proper. The complexity and geological uniqueness of the region to be considered has been thoroughly characterized by the mine geologists over several decades of exploration and research. The measured dataset was characterized by better than 1.5 km effective spacing within a region extending more than 40 kilometers in all directions from the geographic center of the mine proper. The maximum base depth to be considered was chosen as 3000 m in order to provide some information concerning the background upon which the gravitational potential residual surfaces to be examined might be layered.

A baseline of 0.3 degrees, approximately 33 km in latitude and longitude for the geographic location of the mine, was chosen in combination with an interpolation grid spacing of 0.0001 degrees. These values combined to provide a reference region whose gridded and interpolated gravitational surface representation could be readily manipulated with the available implementations of the relevant computer-based tools chosen for use in the investigation.

The work proceeded from a set of depth-to-sea level (high-pass filtered) residual surface representations extracted using base depths from 3000 m to 100 m. The depth increments separating the successive base depths were chosen as 200 m and 100 m in separate extraction processes. These residual representations based upon the information in the full reference region were compared visually to small-baseline residuals constructed from a gridded and interpolated scalar potential surface representation realizing information only from within a 7 minute quadrangle. This describes a reference region extending only 7.5 km from center in all each cardinal direction. The improved informational quality of the full reference region residuals was confirmed.

The inferred transitions and structures that were perceived within these improved residual surface representations were used as a guide in the construction of a second set of full reference region residuals utilizing band-pass filters with sharp cut-offs. The thickness or depth extent of each residual surface representation corresponded to a base depth that was twice the upper depth limit of interest. For example, a 500 m upper depth limit required a base depth of 1000 m, a 1000 m upper depth limit required a base depth of 2000 m, and so on. Additional sets of values representing identical area coverages and lesser thickness parameters (e.g. 500 m, 200 m, 100 m and 50 m from base to upper limit) were also extracted. The subregions, or area coverages, were chosen as centered first at the geographic center of the mine and later at a point at the perceived center of an anomalous structure revealed as a possible candidate for the hypothesized ore body. These subregions had extents that varied from 3 km in each cardinal direction from the appropriate center point down to 500 m in the case of surfaces centered on the candidate anomaly. Each value set that comprised a gridded and interpolated residual surface was also processed by the removal of a robust, third order polynomial trend surface. The subtraction of this trend surface followed the filtering and subregion extraction for each residual surface and the new representation so produced was saved as a distinct, related gridded and interpolated residual scalar potential surface representation, or value set.

The described procedures were repeated for a finer interpolation of 0.00001 degrees within the smallest subregions in order to improve the statistical calculations and considerations.

The entire procedure was repeated a plurality of times varying the trend removal, the centers of consideration with respect to the presumed hypothetical anomalous structure, subregion size, depth extent per residual, and depth increments in an effort to delineate the valid from the potentially invalid treatments of the information.

The subsurface structures revealed and delineated were consistent with the locations, depths, depth extents, relative densities and related structural characteristics of the known stratigraphic units within the mine as verified by geochemical analysis, bore-hole drilling, and other geological studies and procedures conducted across the mine region over a period of years.

The identified anomaly believed to represent the hypothesized ore body was revealed to extend upward from a base depth of 1200 m for distance of at least 300 m. The largest diameter of the ore body in any residual surface examined must be assumed to be approximately equal to or less than 50 m, based upon visual and calculated limits. The density calculated for an appropriate residual surface was 4.0 g/cc within a few percent difference. The identified anomaly was assigned to a location that marked its approximate visual center. All parameter values are well within the acceptable limits as set for the geological parameters that formed the basis of the original hypothesis as presented by the mine geologists.

Accordingly, the reader will see that the inventive methods as proposed and described herein can be used independently or in combination and in cooperation with existing geophysical and analytical techniques to enhance or increase the spatial information and information concerning other geophysical characteristics made available through considerations of the analysis of gridded and interpolated scalar potential surface representations of measured scalar potential data.

While the invention has been described herein relative to its preferred embodiment or embodiments, it is of course contemplated that modifications of, and alternatives to, this embodiment, such modifications and alternatives obtaining the advantages and benefits of this invention, will be apparent to those of ordinary skill in the art having reference to this specification. It is contemplated that such modifications and alternatives are within the scope of this invention as subsequently claimed herein.

What is claimed is:

1. A method for enhancing the depth and spatial resolution of one and two dimensional residual surfaces derived from scalar potential data which has been or will be assembled, collected and prepared by any appropriate methods and apparatus for a plurality of discrete geographic locations within a previously defined primary region of geological interest for the purpose of preparing gridded and interpolated surface representations of said data from which said residual surfaces may be derived, comprising a) the definition of a reference region wherein data collection has occurred or will occur at a plurality of discrete geographic locations wherein said reference region completely contains the primary region of geological interest as a subregion and such that:
      i) the spatial dimension or dimensions of said reference region shall extend in all cardinal directions from the central point of said primary region of interest to plural multiples of the maximum depth of geological interest within the primary region of interest and
      ii) the spatial dimension or dimensions of said reference region shall extend in all cardinal directions from the central point of said primary region of interest to plural multiples of corresponding dimensions of the primary region of interest wherein the inclusion of the information from the additional scalar potential data measurements within the extended dimension or dimensions of said reference region provide means for enhancing the depth and spatial resolution derived from the residual surfaces through increasing the quality and quantity of the information available concerning subsurface geologic structures within the primary region of interest and whereby said increase in the quality and quantity of information within the primary region of interest depends upon the number of multiples of the extent or extents of the primary region of interest contained in the corresponding extent or extents of the reference region and whereby said increase in the quality and quantity of information within the primary region of interest depends upon the the number of multiples of the maximum depth of geological interest within the primary region of interest contained in the extent or extents of the reference region.

* * * * *